US012627061B2

(12) United States Patent
Kim et al.

(10) Patent No.: US 12,627,061 B2
(45) Date of Patent: May 12, 2026

(54) COMMUNICATION LINE AND COMMUNICATION SYSTEM

(71) Applicant: UNIQCONN INC., Seongnam-si (KR)

(72) Inventors: Young Dong Kim, Hwaseong-si (KR); Yong Hun Oh, Pyeongtaek-si (KR); Joung Min Park, Osan-si (KR); Jin Seok Kim, Seongnam-si (KR)

(73) Assignee: UNIQCONN INC., Seongnam-si (KR)

( * ) Notice: Subject to any disclaimer, the term of this patent is extended or adjusted under 35 U.S.C. 154(b) by 30 days.

(21) Appl. No.: 18/888,625

(22) Filed: Sep. 18, 2024

(65) Prior Publication Data

US 2025/0132499 A1 Apr. 24, 2025

(30) Foreign Application Priority Data

Oct. 20, 2023 (KR) ........................ 10-2023-0141476

(51) Int. Cl.
*H01Q 9/28* (2006.01)
*H01Q 1/52* (2006.01)

(52) U.S. Cl.
CPC ............... *H01Q 9/28* (2013.01); *H01Q 1/526* (2013.01)

(58) Field of Classification Search
CPC ................................. H01Q 9/28; H01Q 1/526
See application file for complete search history.

(56) References Cited

U.S. PATENT DOCUMENTS 5,569,876 A * 10/1996 Podgorski ................ H01B 9/04 174/137 R
5,798,736 A * 8/1998 Hall ....................... H01Q 5/357 343/791
6,642,902 B2 * 11/2003 Gustafson ................ H01Q 9/36 343/791
2016/0093419 A1 * 3/2016 Shin ....................... H01B 3/441 174/107
2017/0372818 A1 * 12/2017 Ishikawa ............ H01B 11/1869
2023/0105524 A1 * 4/2023 Nakayama ............... H01B 9/04 174/28

FOREIGN PATENT DOCUMENTS

JP 2004-164944 A 6/2004
JP 2018-006040 A 1/2018
KR 10-2010-0032769 A 3/2010
KR 10-1017951 B1 3/2011

* cited by examiner

*Primary Examiner* — Hai V Tran
(74) *Attorney, Agent, or Firm* — Studebaker Brackett PLLC

(57) ABSTRACT

The present invention relates to a communication line and a communication system. The communication line according to an embodiment of the present invention includes a dielectric portion that extends in a longitudinal direction and transmits a first signal received at one end thereof to the other end thereof, and at least one conductor portion that extends in the longitudinal direction of the dielectric portion and transmits a second signal received at one end thereof to the other end thereof.

17 Claims, 10 Drawing Sheets

COMMUNICATION LINE AND COMMUNICATION SYSTEM

CROSS-REFERENCE TO RELATED APPLICATION

This application claims priority to and the benefit of Korean Patent Application No. 10-2023-0141476, filed on Oct. 20, 2023, the disclosure of which is incorporated herein by reference in its entirety.

BACKGROUND

1. Field of the Invention

The present invention relates to a communication line and a communication system, and more particularly, to a communication line for signal transmission and a communication system using the same.

2. Discussion of Related Art

Communication lines made of dielectrics have a lower manufacturing cost than conductor-based communication lines and their installation and management are easier than optical-based communication lines, thereby efficiently utilizing the communication lines in chip-to-chip communications.

However, in addition to data signals, various signals may be required to be transmitted using communication lines. There is a problem in that conventional communication lines are not suitable for transmitting various signals and have severe mutual interference between the signals, which causes the quality of the signals to be degraded.

Further, conventional communication lines have a problem in that an amount of the outside leakage of signals propagating in the conventional communication lines is excessive. Accordingly, the signals propagating through the conventional communication lines become incomplete, and as the length of the communication line increases, the attenuation of the signal may increase, cumulative signal loss may increase, and noise may be generated in electronic devices around the communication line.

Meanwhile, the related art described above is technical information that the inventor possessed for deriving the present invention or acquired during the process of deriving the present invention, and cannot necessarily be considered as publicly known technology disclosed to the general public prior to the application of the present invention.

RELATED ART DOCUMENT

Patent Document (Patent Document 1) Korean Laid-open Patent Publication No. 10-2010-0032769 (Mar. 26, 2010)

SUMMARY OF THE INVENTION

The present invention is directed to providing a communication line capable of simultaneously transmitting various signals with high quality without mutual interference.

The present invention is also directed to providing a communication line capable of transmitting high-frequency electromagnetic wave signals with a low loss rate.

The present invention is also directed to providing a communication line or communication system capable of significantly reducing an electric field leaking to the outside.

The present invention is also directed to providing a communication system capable of easily connecting a communication line to a substrate.

Objects of the present invention are not limited to the above-described object and other objects that are not described may be clearly understood by those skilled in the art from the following descriptions.

According to an aspect of the present invention, there is provided a communication line which includes a dielectric portion that extends in a longitudinal direction and transmits a first signal received at one end thereof to the other end thereof, and at least one conductor portion that extends in the longitudinal direction of the dielectric portion and transmits a second signal received at one end thereof to the other end thereof.

The dielectric portion may include a core portion extending in a longitudinal direction, a shielding portion in a cylindrical shape that is disposed outside the core portion and extends in the longitudinal direction of the core portion, and at least one rib extending from an outer surface of the core portion to an inner surface of the shielding portion.

The conductor portion may be disposed in the shielding portion.

The rib may be provided as a plurality of ribs.

The plurality of ribs may include a first rib, a second rib adjacent to the first rib, a third rib adjacent to the second rib, and a fourth rib adjacent to the third rib, and the first to fourth ribs may be disposed to be spaced an equal interval from each other.

The conductor portion may be provided as a plurality of conductor portions, and the plurality of conductor portions may be disposed between the first rib and the second rib and between the third rib and the fourth rib.

The conductor portion may be provided as a plurality of conductor portions, and the rib and the conductor portion disposed between the ribs may be disposed to be maximally spaced apart from each other.

The conductor portion may be provided as a plurality of conductor portions, and some of the plurality of conductor portions and the remaining conductor portions may be disposed at opposite sides with the core portion interposed therebetween.

The conductor portion may be provided as a plurality of conductor portions, and the number of the conductor portions disposed between two adjacent ribs may be constant.

The conductor portion may be disposed at an end portion of the rib.

At least one insertion groove may be formed in an outer surface of the shielding portion, and the at least one conductor portion may be disposed in the insertion groove.

The conductor portion may be disposed in the middle of the rib.

A protruding portion may be formed, when the conductor portion is disposed, on the inner surface of the shielding portion or on the at least one rib so that a dielectric material constituting the shielding portion or the rib may surround the conductor portion.

The core portion, the shielding portion, and the at least one rib are made of the same dielectric material.

The first signal and the second signal may be different.

According to another aspect of the present invention, there is provided a communication system which includes the communication line according to an embodiment of the present invention, and a substrate on which a terminal connected to the conductor portion is disposed.

The communication system may further include a connecting member which is connected to the communication line and in which at least one opening is formed, wherein the terminal and the conductor portion are connected to a conductor line through the opening.

The communication system may further include an antenna that is disposed on the substrate and transmits or receives the first signal, and a coupler that is connected to the connecting member and guides the first signal between the antenna and the communication line.

The communication line of the communication system may be installed such that a direction in which a rib extends from a core portion is misaligned with a horizontal polarization direction or a vertical polarization direction of an electromagnetic wave signal so that a signal transmitted inside the communication line does not leak to an outside of the communication line.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
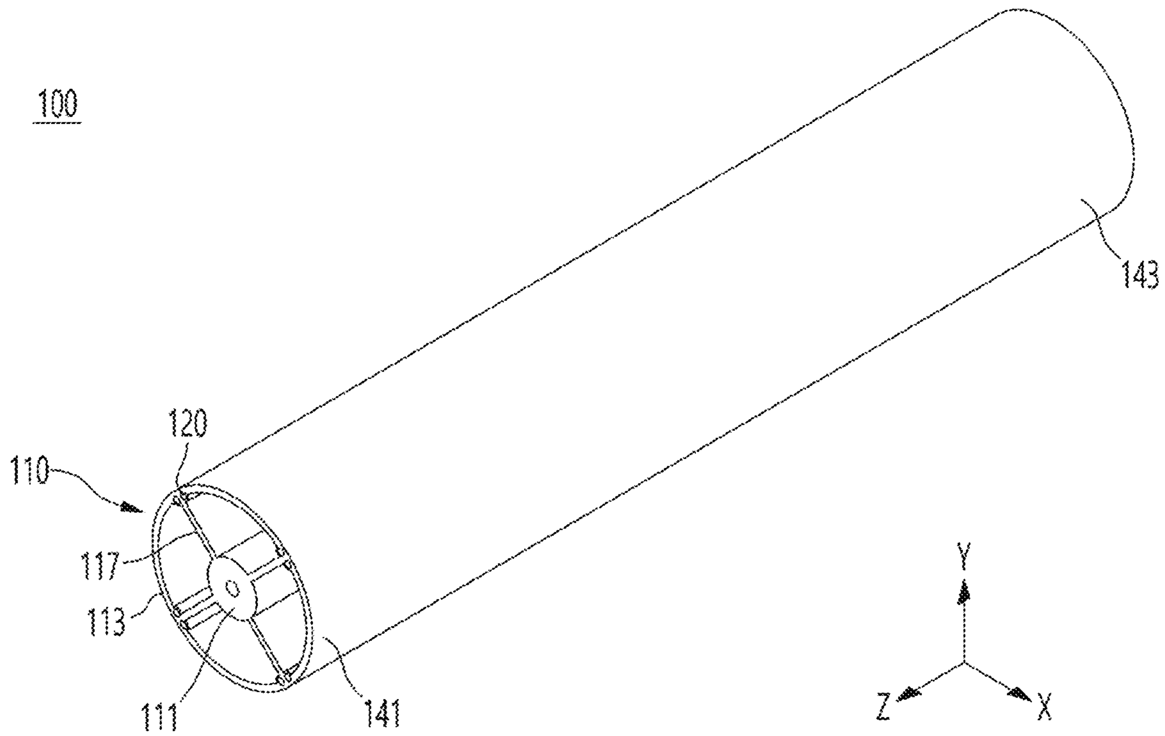
FIG. 1 is a perspective view of a communication line according to an embodiment of the present invention.

Advantages and features of the present invention and methods of achieving the same will be clearly understood with reference to the accompanying drawings and embodiments described in detail below. However, the present invention is not limited to the embodiments disclosed below, but may be implemented in various different forms. The embodiments are provided in order to fully explain the present invention and fully explain the scope of the present invention for those skilled in the art. That is, the scope of the present embodiments is only defined by the appended claims.

The shapes, sizes, ratios, angles, numbers, or locations disclosed in the drawings for describing the embodiments of the present invention are exemplary, and therefore, the present invention is not limited to the matters illustrated. Further, in description of the present invention, when it is determined that detailed descriptions of related well-known functions or configurations may unnecessarily obscure the gist of the present invention, detailed descriptions thereof will be omitted. Further, when the terms "include," "have," "consist of," etc., are used in this specification, another portion may be added unless "only" is used. When a component is expressed in the singular form, it includes a case where it includes a plural form unless the context clearly indicates otherwise.

In interpretation of components, it is interpreted as including a range of errors even when there is no separate explicit description. For example, unless otherwise explicitly stated, the term "same" does not mean exactly the same, but rather "substantially the same" within a range of error that those skilled in the art may reasonably expect to encounter in practicing the present invention.

It should be understood that, although the terms "first," "second," etc., may be used herein to describe various components, these components are not limited by these terms. The terms are only used to distinguish one component from another component. Therefore, it should be understood that a first component to be described below may be a second component within the technical scope of the present invention.

Unless otherwise specified, like reference numerals refer to like elements throughout the specification.

The individual features of the various embodiments of the present invention may be partially or wholly combined or combined with each other, and as can be fully understood by those skilled in the art, various technical connections and operations are possible, and each embodiment may be implemented independently of each other or may be implemented together in a related relationship.

In the present invention, when a plurality of components are connected, it should be understood that the respective components may be connected not only directly to each other, but also indirectly. Therefore, when the plurality of components are connected to each other, another component may be connected between the plurality of components.

In description of various embodiments of the present invention, when some configuration of an embodiment is substantially the same as or corresponding to some configuration of another embodiment described above, the description of that configuration may be omitted for a clear and concise description of the present invention. Further, when some configurations have a structure that is symmetrical with other configurations, for example, a structure with axial symmetry or rotational symmetry, so that both configurations are substantially the same configuration with only a difference in direction or location, the description of the configuration may be omitted for the sake of a clear and concise description of the present invention, unless it is necessary to specify the present invention.

Hereinafter, the present invention will be described in detail with reference to the accompanying drawings.

FIG. 1 is a perspective view of a communication line according to an embodiment of the present invention.

First, referring to FIG. 1, a communication line 100 includes a dielectric portion 110 that extends in a longitudinal direction and transmits a first signal received at one end 141 thereof to the other end 143, and at least one conductor portion 120 that extends in the longitudinal direction of the dielectric portion 110 and transmits a second signal received at the one end 141 thereof to the other end 143. Here, the longitudinal direction may be a Z-axis direction illustrated in FIG. 1.

According to the embodiment of the present invention, the communication line 100 may perform bidirectional signal transmission. For example, referring to FIG. 1, each of the dielectric portion 110 and the conductor portion 120 of the communication line 100 may transmit the first signal and the second signal from the one end 141 to the other end 143, as well as transmit the first signal and the second signal from the other end 143 to the one end 141.

In the present invention, the dielectric may be a material having permittivity. The permittivity is a value for the effect of a medium between charges on an electric field when the electric field acts between the charges, and depends on the frequency of an electromagnetic wave signal propagating in a dielectric. Further, when an electromagnetic wave signal propagates toward a boundary between materials having different permittivity, the electromagnetic wave signal may be adjusted to be totally reflected at the boundary between the two materials by adjusting permittivity, a signal incident angle of each of the two materials, or a frequency of the signal. That is, the electromagnetic wave signal may propagate along a dielectric material.

Further, the first signal received at the one end 141 of the communication line 100 according to the embodiment of the present invention may be an electromagnetic wave signal. Accordingly, due to the properties of the dielectric described above, the first signal may be transmitted to the other end 143 in the longitudinal direction of the dielectric portion 110 through the dielectric material constituting the dielectric portion 110.

Meanwhile, various signals may be required to be transmitted in the communication system. For example, in the communication system, in addition to data signals, which are high-frequency electromagnetic wave signals, a supply of power (source) or ground, etc. may be required, and transmission of low-speed or low-frequency signals, such as on-off signals, may be required.

According to the embodiment of the present invention, the first signal transmitted through the dielectric portion 110 and the second signal transmitted through the conductor portion 120 may be different. Further, the first signal may be the above high-frequency electromagnetic wave data signal, and the second signal may be a low-speed or low-frequency signal. Accordingly, the communication line 100 may simultaneously transmit not only the first signal, which is a data signal, but also the second signal, which is different from the first signal, from the one end 141 to the other end 143.

Further, as illustrated in FIG. 1, the conductor portion 120 may be provided as a plurality of conductor portions 120. In this case, since the second signal transmitted through the conductor portion 120 is provided as a plurality of second signals, the communication line 100 may simultaneously transmit various signals in addition to the data signal. However, the number of conductor portions 120 is not limited. For example, the number of conductor portions 120 disposed in the communication line 100 may be one.

Figure 2:
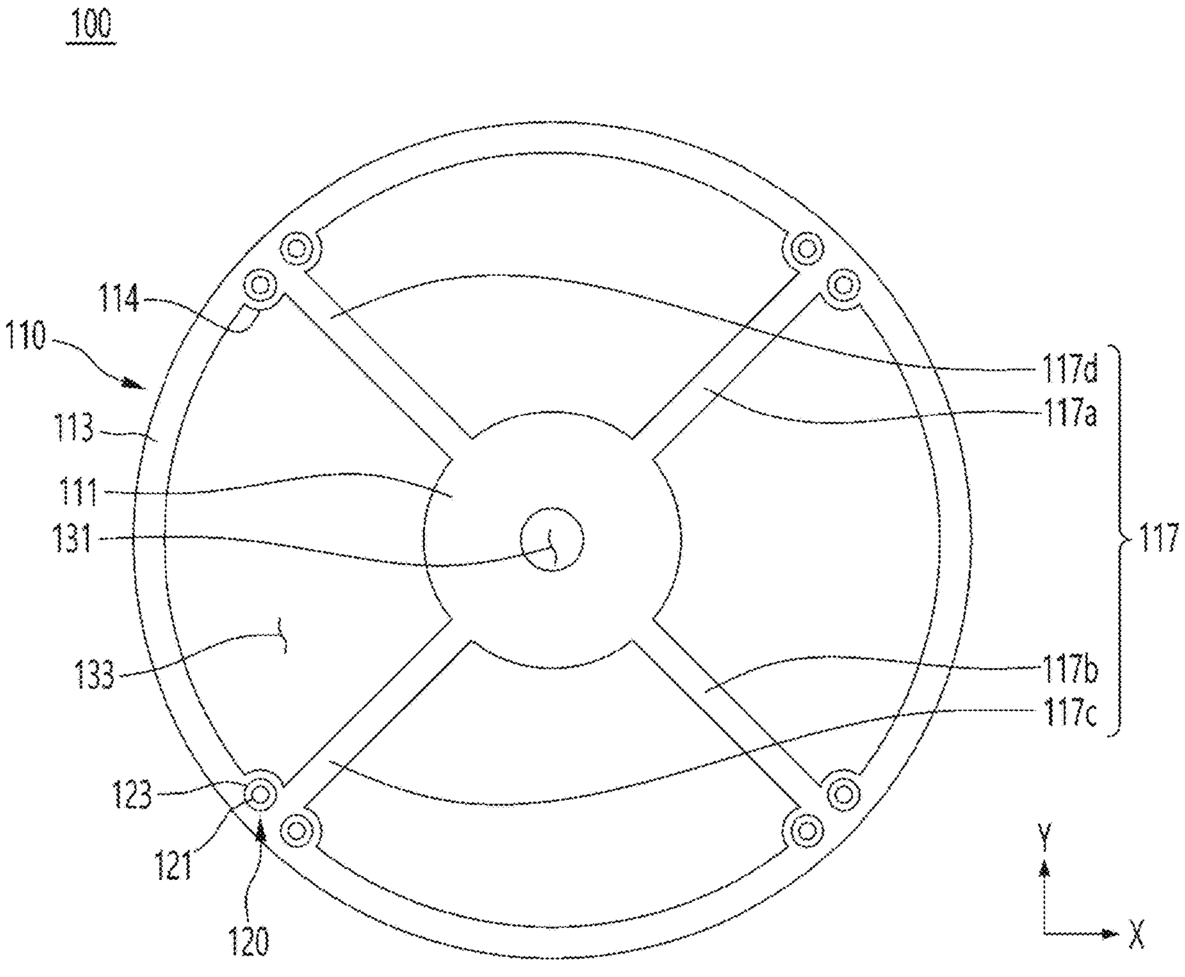
FIG. 2 is a cross-sectional view of the communication line in a direction perpendicular to a longitudinal direction according to an embodiment of the present invention.

FIG. 2 is a cross-sectional view of the communication line in a direction perpendicular to a longitudinal direction according to an embodiment of the present invention.

Referring to FIG. 2, the conductor portion 120 may include a wire 121 and a cover 123 that surrounds the wire 121. In this case, the second signal transmitted through the conductor portion 120 may not be leaked to the outside of the conductor portion 120, and may not be affected by the outside of the conductor portion 120. Accordingly, the communication line 100 may transmit the first signal transmitted through the dielectric portion 110 and the second signal transmitted through the conductor portion 120 with high quality without mutual interference.

Referring to FIGS. 1 and 2, the dielectric portion 110 may include a core portion 111 extending in the longitudinal direction. Further, the dielectric portion 110 may further include a cylindrical shielding portion 113 that is disposed outside the core portion 111 and extends in the longitudinal direction of the core portion 111. Further, the dielectric portion 110 may further include one or more ribs 117 extending from an outer surface of the core portion 111 to an inner surface of the shielding portion 113.

The core portion 111 according to the embodiment of the present invention may be made of a dielectric material having a higher permittivity than the air has. Further, an air layer 133 may be formed between the ribs 117. Accordingly, due to the properties of the above dielectric, the core portion 111 may transmit the first signal received at the one end 141 of the communication line 100 to the other end 143 of the communication line 100, and the first signal may be totally reflected inside the core portion 111 and may not leak through the air layer 133. Accordingly, the communication line 100 may transmit a high-frequency electromagnetic wave signal with a low loss rate.

Further, the core portion 111 according to the embodiment of the present invention may have a cylindrical shape. For example, referring to FIG. 2, a central hole 131 may be formed inside the core portion 111. Further, the outer surface of the core portion 111 and the central hole 131 may have a circularly extended shape. In this case, as illustrated in FIG. 2, the core portion 111 and the central hole 131 may share a central axis. However, the shapes and locations of the core portion 111 and the central hole 131 are not limited thereto. For example, a cross-section of the central hole 131 in a direction perpendicular to the longitudinal direction may have a polygonal shape and may be formed at a location outside the central axis of the core portion 111. When the central hole 131 is formed in the core portion 111 in this way, the force consumed to bend the core portion 111 may be reduced. Accordingly, since the communication line 100 is easy to bend, the communication line 100 may be installed in various forms even in a narrow or complex space.

Meanwhile, the shielding portion 113 according to the embodiment of the present invention may protect the core portion 111 through which the signal is transmitted, from the outside of the communication line 100. Further, the rib 117 may support the shielding portion 113.

The ribs 117 according to the embodiment of the present invention may be formed in a straight line in a radial direction from the core portion 111. Here, the radial direction from the core portion 111 may be a direction outward from the center of the core portion 111. In this case, the communication line may be easily installed in the communication system so that a polarization direction of an electromagnetic wave signal radiated from the antenna and an extension direction of the rib 117 are misaligned with each other. This will be described below with reference to FIG. 9.

The rib 117 according to the embodiment of the present invention may be provided as a plurality of ribs 117. For example, referring to FIG. 2, the ribs 117 may include a first rib 117*a*, a second rib 117*b* adjacent to the first rib 117*a*, a third rib 117*c* adjacent to the second rib 117*b*, and a fourth rib 117*d* adjacent to the third rib 117*c*. When the plurality of ribs 117 are provided as described above, the shielding portion 113 becomes more solid, and thus the durability of the communication line 100 against external impact or bending can be improved.

Further, referring to FIG. 2, the first to fourth ribs 117*a*, 117*b*, 117*c*, and 117*d* may be disposed to be spaced an equal interval from each other. When the ribs 117 are disposed to be spaced an equal interval from each other, it can be easier to bend the communication line 100. For example, when four ribs 117 are disposed to be spaced an equal interval from each other as described in FIG. 2, the communication line 100 may be easily bent up and down and left and right.

However, the number of ribs 117 is not limited. For example, the number of ribs 117 may be three. For another example, the number of ribs 117 may be one. When the number of ribs 117 is reduced in this way, the amount of electromagnetic wave signals that are transmitted through the core portion 111 and emitted through the ribs 117 is reduced, and thus the signal transmission efficiency of the communication line 100 can be improved.

Meanwhile, the conductor portion 120 according to the embodiment of the present invention may be disposed in the shielding portion 113. For example, the conductor portion 120 may be disposed to be surrounded with the dielectric material constituting the shielding portion 113. That is, the conductor portion 120 may be disposed to be embedded in the dielectric material constituting the shielding portion 113.

When the conductor portion 120 is disposed to be surrounded with the dielectric material as described above, the conductor portion 120 may be integrally manufactured with the dielectric portion 110. For example, when the communication line 100 is manufactured, the dielectric portion 110 that transmits data at high speed and the conductor portion 120 that transmits various pieces of data may be simultaneously compression-molded or extrusion-molded. Accordingly, according to the embodiment described above, the manufacturing cost and time of the communication line 100 can be reduced.

Meanwhile, as described above, the first signal is transmitted to the dielectric portion 110, and the second signal is transmitted to the conductor portion 120. Since the first signal and the second signal are electrical signals, the first signal and the second signal may each emit electromagnetic waves. Accordingly, when a distance between the dielectric portion 110 and the conductor portion 120 is small, a problem in which the first signal and the second signal mutually interfere with each other may occur. However, since the shielding portion 113 in the communication line 100 is a portion that is the farthest from the dielectric portion 110, mutual interference between the first signal and the second signal can be minimized when the conductor portion 120 is disposed in the shielding portion 113 as illustrated in FIG. 2.

For example, as illustrated in FIG. 2, the conductor portion 120 may be disposed to be surrounded with the dielectric material constituting the shielding portion 113. In this case, since the conductor portion 120 is not exposed to the outside of the communication line 100, the conductor portion 120 may be protected from impact from the outside of the communication line 100. Further, since the location of the conductor portion 120 is fixed to the shielding portion 113 so that the conductor portion 120 does not shake even when the communication line 100 moves, the quality of the second signal transmitted through the conductor portion 120 cannot be degraded.

Figure 6:
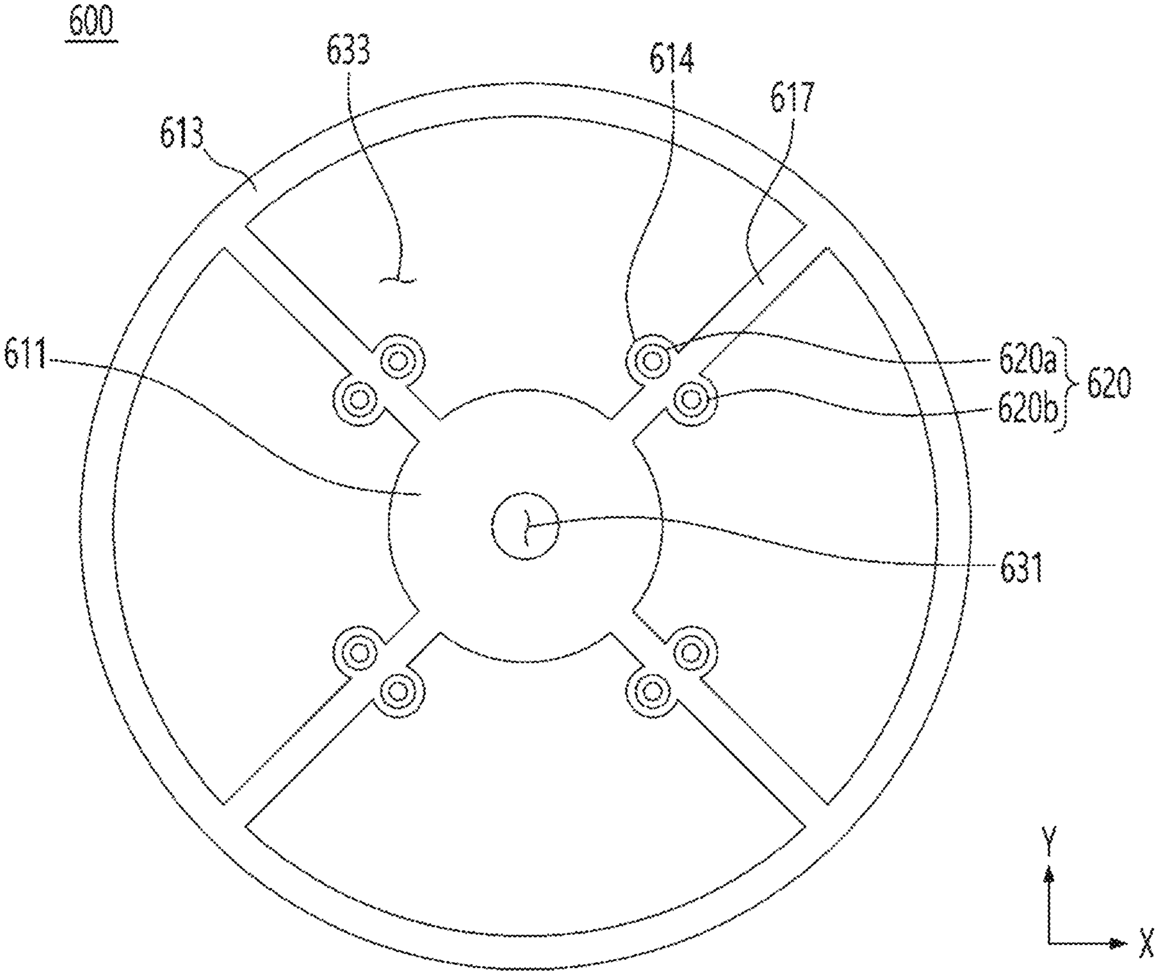
FIG. 6 is a cross-sectional view of a communication line in a direction perpendicular to a longitudinal direction according to yet another embodiment of the present invention.

Meanwhile, according to the embodiment of the present invention, when conductor portions 120 and 620 are disposed on at least one of the inner surface of the shielding portion 113 or a rib 617, protruding portions 114 and 614 may be formed so that the dielectric material constituting the shielding portion 113 or the rib 617 can surround the conductor portions 120 and 620. For example, referring to FIG. 2, the protruding portion 114 may be formed on the inner surface of the shielding portion 113 so that the dielectric material constituting the shielding portion 113 can surround the conductor portion 120. For another example, referring to FIG. 6, the protruding portion 614 may be formed in the rib 617 so that the dielectric material constituting the rib 617 can surround the conductor portion 620. FIG. 6 will be described below.

When the conductor portion 120 is disposed to be surrounded with the dielectric material constituting the shielding portion 113 or the rib 617, the shielding portion 113 or the rib 617 may become thinner, and thus durability of the shielding portion 113 or the rib 617 can be reduced. On the other hand, when the protruding portions 114 and 614 are formed on the inner surface of the shielding portion 113 or the rib 617 and the conductor portions 120 and 620 are disposed inside the protruding portions 114 and 614 as in the above-described embodiment, the conductor portions 120 and 620 may be surrounded with the dielectric material. Accordingly, the conductor portions 120 and 620 may be protected from external impact, mutual interference between the first signal and the second signal may be reduced, and at the same time, the durability of the shielding portion 113 or the rib 617 cannot be reduced.

Further, as the protruding portions 114 and 614 are formed, the conductor portions 120 and 620 may be surrounded with the dielectric material constituting the shielding portion 113 or the rib 617. Accordingly, when the communication lines 100 and 600 are manufactured, the dielectric material and the conductor portions 120 and 620 may be simultaneously compression-molded or extrusion-molded, and thus the manufacturing time and cost can be reduced.

Meanwhile, according to the embodiments of the present invention, although the protruding portions 114 and 614 are formed, the protruding portions 114 and 614 are components for surrounding the conductor portions 120, 320, 420, 520, and 620 with the dielectric material as described above, and thus the protruding portions 114 and 614 cannot be formed when the conductor portions 120, 320, 420, 520, and 620 may be stably surrounded with the dielectric material.

Meanwhile, the conductor portion 520 according to the embodiment of the present invention is disposed in a shielding portion 513, but may be disposed not to be surrounded with the dielectric material constituting the shielding portion 513. For example, the conductor portion 520 may be disposed to be inserted into the insertion groove 515 formed in the outer surface of the shielding portion 513. In this case, the conductor portion 520 may be disposed so that one side thereof is not surrounded with the dielectric material. This embodiment will be described below with reference to FIG. 5. Further, the conductor portion 620 may be disposed in the middle of the rib 617, not in a shielding portion 613. This embodiment will be described below with reference to FIG. 6.

Meanwhile, referring to FIG. 2, the conductor portion 120 is disposed in the shielding portion 113, but may be disposed at an end portion of the rib 117. That is, the conductor portion 120 may be disposed at a portion of the shielding portion 113 in which the rib 117 is formed. Since the portion of the shielding portion 113 in which the rib 117 is formed is a portion of the communication line 100 in which the dielectric material is thick and durable, the conductor portion 120 disposed at the end portion of the rib 117 may be stably supported.

On the other hand, the conductor portion 120 is disposed in the shielding portion 113, but may be disposed to be spaced apart from the end portion of the rib 117. This will be described with reference to FIG. 3.

Figure 3:
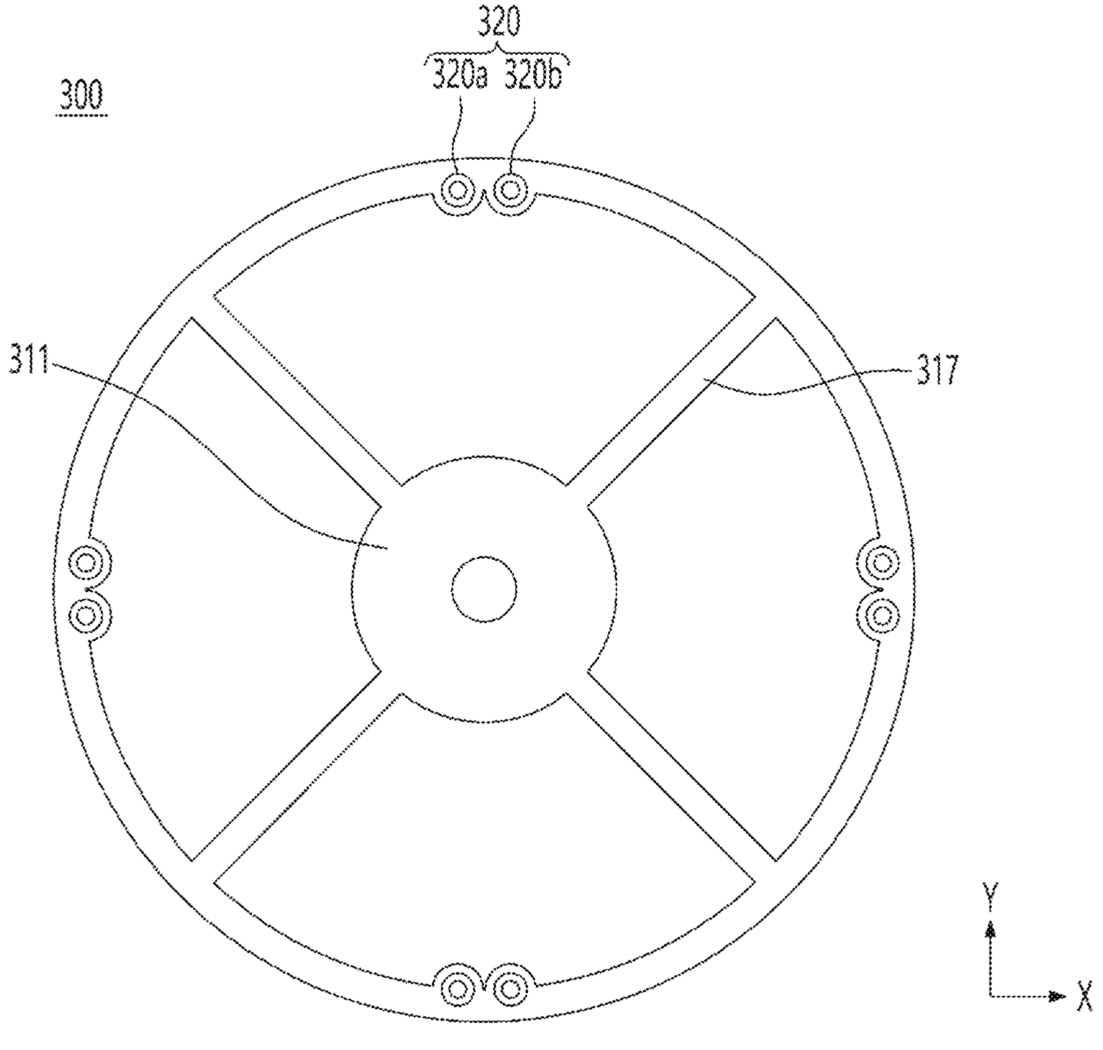
FIG. 3 is a cross-sectional view of a communication line in a direction perpendicular to a longitudinal direction according to another embodiment of the present invention.

FIG. 3 is a cross-sectional view of a communication line in a direction perpendicular to a longitudinal direction according to another embodiment of the present invention.

Referring to FIG. 3, a conductor portion 320 is disposed in a shielding portion 113 and may be disposed between ribs 317. According to the properties of the dielectric described above, the electromagnetic wave generated in the portion where the electric signal is transmitted may be emitted along the dielectric. Therefore, the electromagnetic wave generated from the first signal transmitted through a core portion 311 may be transmitted along the ribs 317. In this case, according to the embodiment illustrated in FIG. 3, since the conductor portion 320 is disposed to be spaced apart from the end portion of the rib 317 as much as possible, the interference effect between the transmission characteristics of the first signal transmitted through the core portion 311 and the transmission characteristics of the second signal transmitted through the conductor portion 320 can be reduced as much as possible.

Meanwhile, in FIG. 3, a first conductor portion 320*a* and a second conductor portion 320*b* are illustrated as being disposed between the ribs 317, but the number of conductor portions 320 is not limited thereto. For example, only the first conductor portion 320*a* may be disposed between the ribs 317.

Meanwhile, according to the embodiment of the present invention, the number of conductor portions disposed between two adjacent ribs may be constant. For example, referring to FIG. 3, the number of conductor portions 320 disposed between two adjacent ribs 317 may be constant as two. In this case, the communication line 300 may have a symmetrical structure and may have a stable structure and electromagnetic properties.

Meanwhile, according to still another embodiment of the present invention, a region where the conductor portion is not disposed between the ribs may be present in the communication line. Specifically, the conductor portion may be disposed only in some regions between the first rib and the second rib, between the second rib and the third rib, between the third rib and the fourth rib, and between the fourth rib and the first rib. For example, the conductor portion may be disposed between the first rib and the second rib and between the third rib and the fourth rib. This will be described with reference to FIG. 4.

Figure 4:
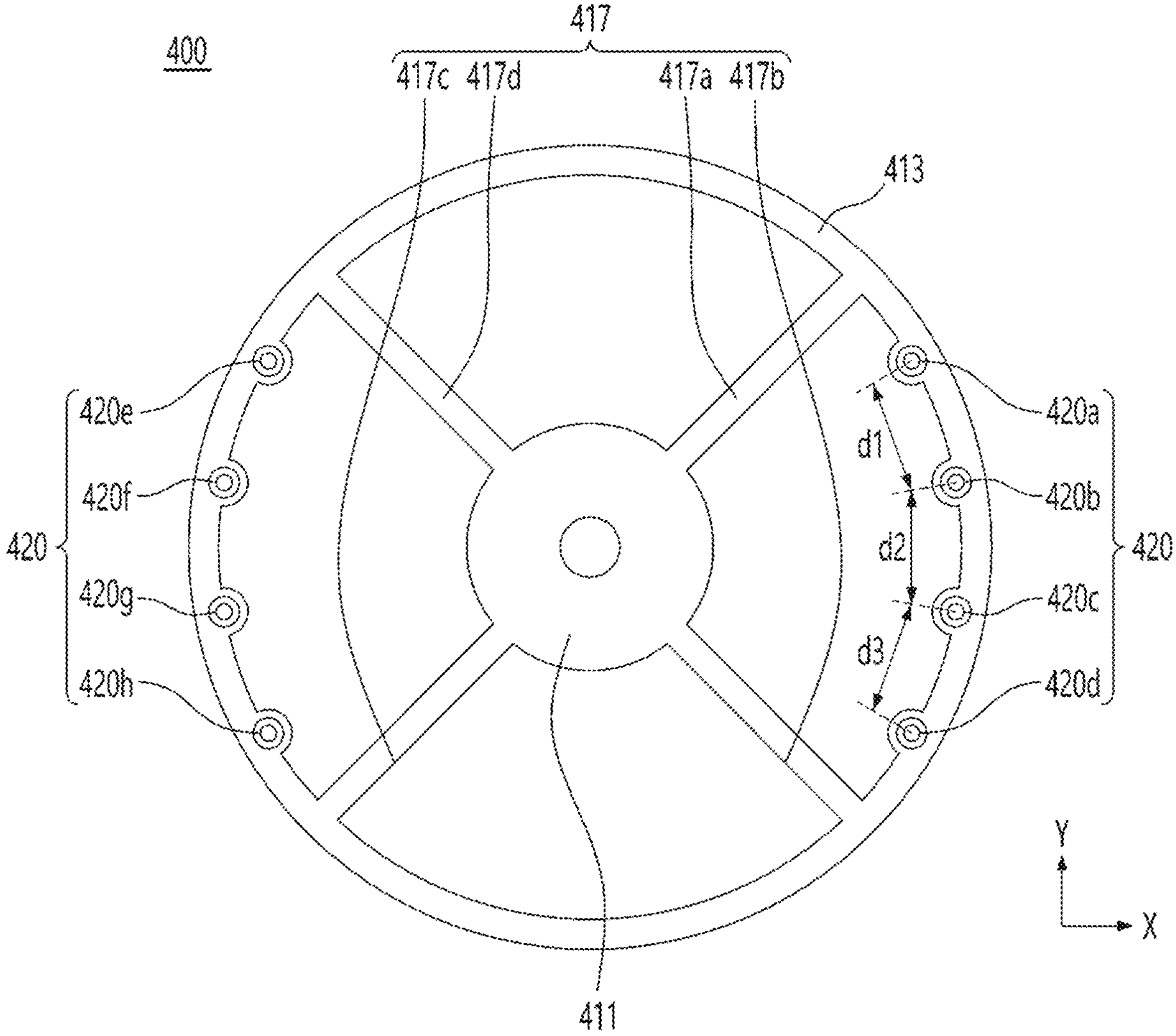
FIG. 4 is a cross-sectional view of a communication line in a direction perpendicular to a longitudinal direction according to still another embodiment of the present invention.

FIG. 4 is a cross-sectional view of a communication line in a direction perpendicular to a longitudinal direction according to still another embodiment of the present invention.

Referring to FIG. 4, conductor portions 420 may be disposed only between a first rib 417*a* and a second rib 417*b* and between a third rib 417*c* and a fourth rib 417*d*. Further, no conductor portions 420 may be disposed between the second rib 417*b* and the third rib 417*c* and between the fourth rib 417*d* and the first rib 417*a*.

Since a substrate has a flat shape and a communication line 400 has a cylindrical shape, when the conductor portions 420 are disposed on all surfaces of the communication line 400, it is difficult to connect each conductor portion 420 to the substrate. However, as described above, when the conductor portions 420 are disposed only between the first rib 417*a* and the second rib 417*b* and between the third rib 417*c* and the fourth rib 417*d*, the conductor portions 420 are collectively disposed on both sides of the communication line 400, and thus the conductor portions 420 may be easily connected to the substrate when the communication line 400 is installed. Such a structure will be described below with reference to FIG. 10.

Meanwhile, according to the embodiment of the present invention, the rib and the conductor portions disposed between the ribs may be disposed to be spaced apart from each other as much as possible. For example, referring to FIG. 4, conductor portions 420*a*, 420*b*, 420*c*, and 420*d* disposed between the first rib 417*a* and the second ribs 417*b* may be disposed to be spaced apart from each other as much as possible. Specifically, a first conductor portion 420*a* may be disposed to be close to the first rib 417*a*, a fourth conductor portion 420*d* may be disposed to be close to the second rib 417*b*, and a second conductor portion 420*b* and a third conductor portion 420*c* may be disposed so that distances d1, d2, and d3 are the same. Similarly, conductor portions 420*e*, 420*f*, 420*g*, and 420*h* disposed between the third rib 417*c* and the fourth rib 417*d* may also be disposed to be spaced apart from each other as much as possible.

As described above, each conductor portion 420 generates electromagnetic waves, and these electromagnetic waves may affect the second signal transmitted through another conductor portion 420. Therefore, when the ribs and the conductor portions 420 disposed between the ribs are spaced apart from each other as much as possible, the quality of the second signal transmitted through the communication line 400 may be improved.

Meanwhile, according to the embodiment of the present invention, some conductor portions 420 and the remaining conductor portions 420 may be disposed at opposite sides with the core portion 411 interposed therebetween. For example, referring to FIG. 4, some conductor portions 420*a*, 420*b*, 420*c*, and 420*d* and the remaining conductor portions 420*e*, 420*f*, 420*g*, and 420*h* excluding the some conductor portions may be disposed at opposite sides with the core portion 411 interposed therebetween. In this case, distances between some conductor portions 420*a*, 420*b*, 420*c*, and 420*d* and the remaining conductor portions 420*e*, 420*f*, 420*g*, and 420*h* can be maximized so that mutual interference due to the emission of the electromagnetic wave can be minimized.

Meanwhile, as described above, the conductor portions may be disposed to be inserted into the outer surface of the shielding portion. This will be described with reference to FIG. 5.

Figure 5:
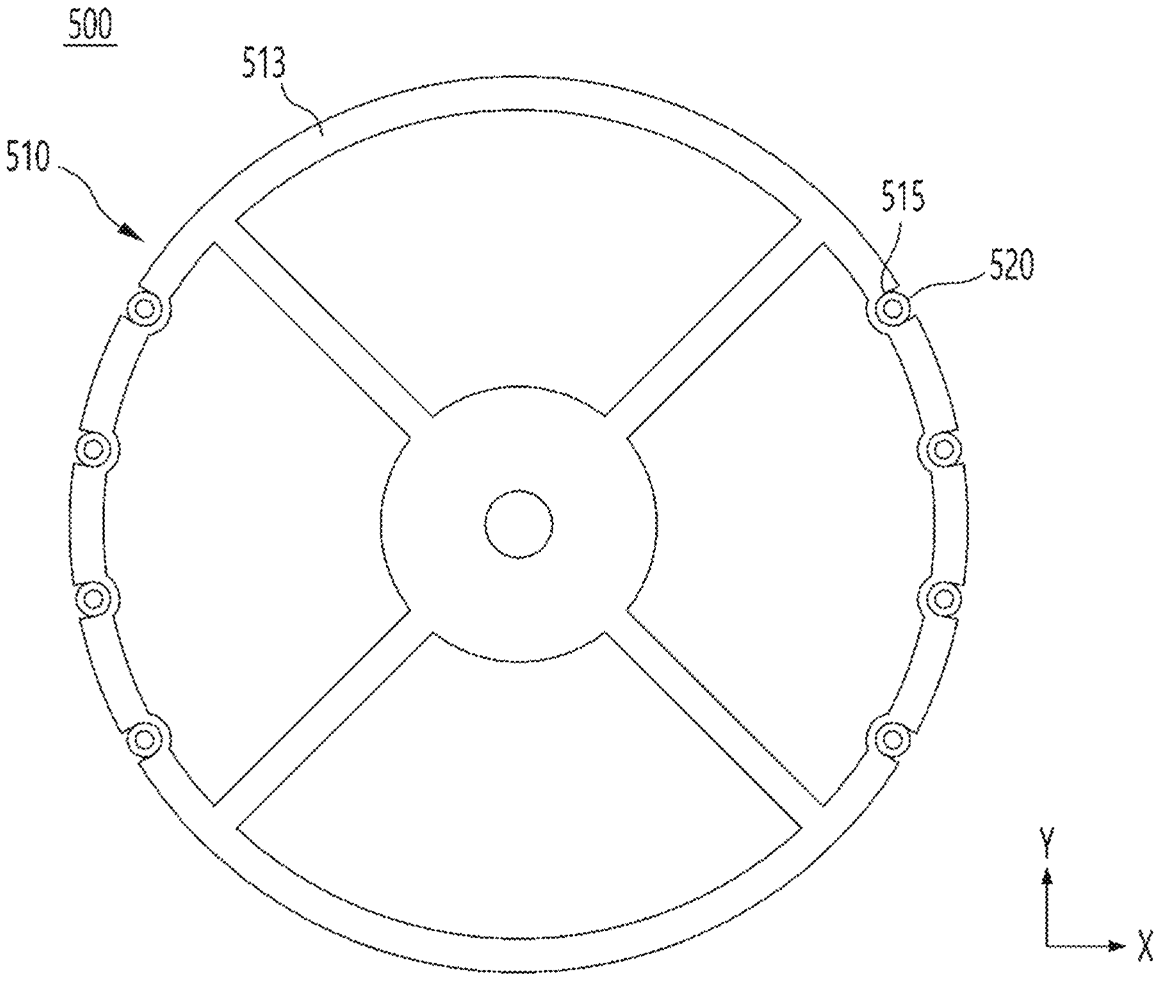
FIG. 5 is a cross-sectional view of a communication line in a direction perpendicular to a longitudinal direction according to yet another embodiment of the present invention.

Referring to FIG. 5, at least one insertion groove 515 may be formed in the outer surface of the shielding portion 513. Further, at least one of conductor portions 520 may be disposed in the insertion groove 515. Specifically, the conductor portion 520 may be disposed to be fitted into the insertion groove 515.

Unlike the other embodiments described above, according to the embodiment disclosed in FIG. 5, a dielectric portion 510 and the conductor portion 520 are separate components and are coupled to each other to form a communication line

500. Accordingly, the communication line 500 may be formed in various ways. Accordingly, the number of conductor portions 520 that should be inserted into the insertion groove 515 may be determined according to the number of terminals of a substrate or the number of second signals required in a communication system. For example, as disclosed in FIG. 5, four insertion grooves 515 are formed on each of both sides, so that only four conductor portions 520 may be disposed in the dielectric portion 510 having a total of eight insertion grooves 515. Further, conductor portions 520 having different structures or properties may be disposed in the dielectric portion 510 depending on the purpose of the second signals required in the communication system.

Meanwhile, the conductor portions may be disposed on the ribs instead of the shielding portion. This will be described with reference to FIG. 6.

FIG. 6 is a cross-sectional view of a communication line in a direction perpendicular to a longitudinal direction according to yet another embodiment of the present invention.

Referring to FIG. 6, a conductor portion 620 may be disposed in the middle of the rib 617. Further, a protruding portion 614 may be formed in the rib 617 so that a dielectric material constituting the rib 617 can surround the conductor portion 620. Meanwhile, in FIG. 6, two conductor portions 620*a* and 620*b* are illustrated as being disposed on both sides of the rib 617, but the number of conductor portions 620 is not limited thereto.

Meanwhile, a distance between the conductor portion 620 and a core portion 611 disclosed in FIG. 6 and a distance between the conductor portion 120 and the core portion 111 disclosed in FIG. 2 are different. When the distance between the conductor portion 620 and the core portion 611 and the distance between the conductor portion 120 and the core portion 111 are different as described above, the intensities of electromagnetic fields emitted from the communication lines through which the signals are transmitted may also be different. This will be described with reference to FIGS. 7 and 8.

Figure 7:
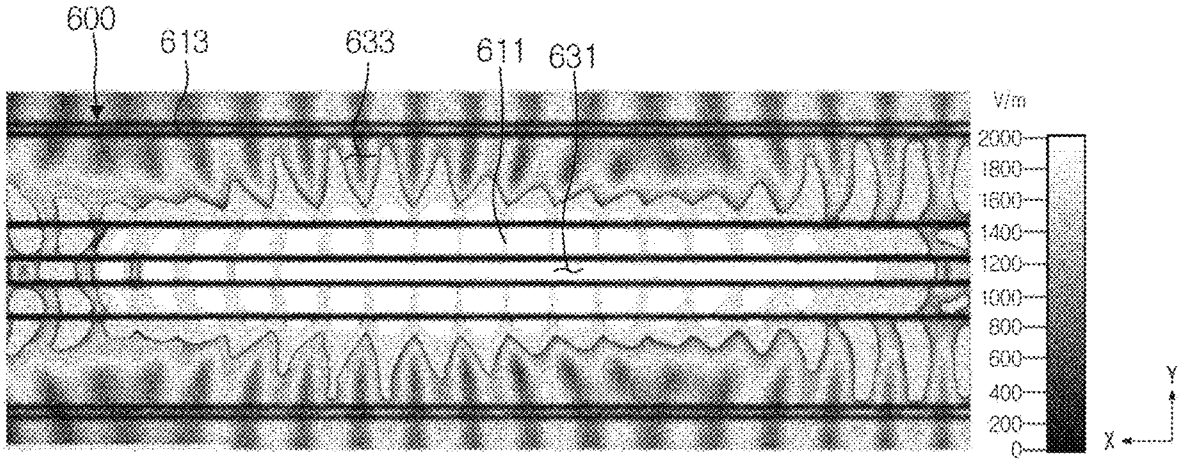
FIG. 7 is a view for describing a distribution of an electromagnetic field in a longitudinal direction when a signal is transmitted through the communication line according to the embodiment disclosed in FIG. 6.
Figure 8:
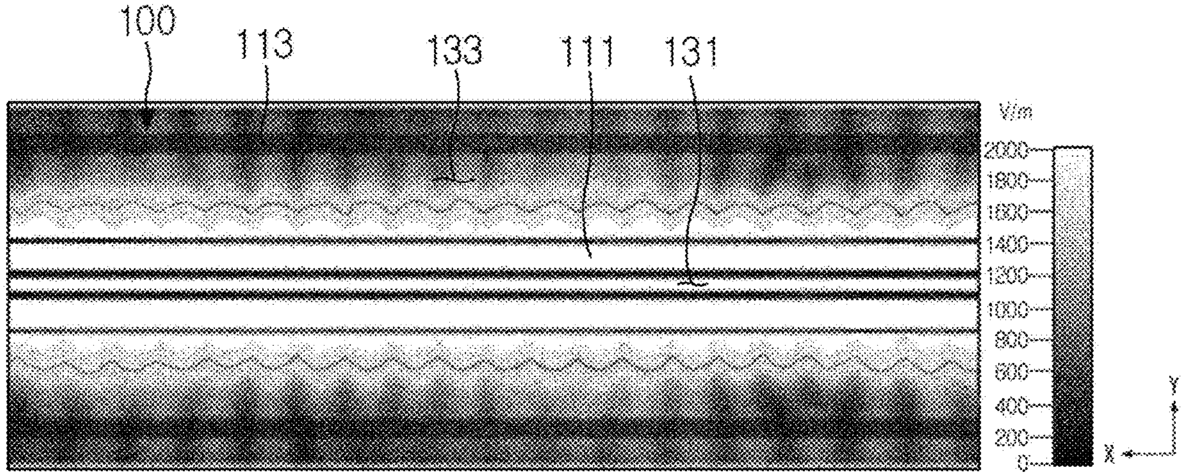
FIG. 8 is a view for describing a distribution of an electromagnetic field in the longitudinal direction when a signal is transmitted through the communication line according to the embodiment disclosed in FIG. 2.

FIG. 7 is a view for describing a distribution of an electromagnetic field in a longitudinal side when a signal is transmitted through the communication line according to the embodiment disclosed in FIG. 6. FIG. 8 is a view for describing a distribution of an electromagnetic field in the longitudinal side when a signal is transmitted through the communication line according to the embodiment disclosed in FIG. 2.

In the case of FIG. 7, an electromagnetic field emitted from the core portion 611 through which a first signal is transmitted is emitted to the outside of the shielding portion 613 through an air layer 633. This is because the distance between the conductor portion 620 and the core portion 611 disclosed in FIG. 6 is small and the electromagnetic field emitted from the core portion 611 becomes stronger as the electromagnetic field passes through the conductor portion 620. Accordingly, the signal transmission efficiency of the communication line 600 is reduced, and the electromagnetic field is emitted to the outside of the communication line 600, which may cause interference in other electrical devices.

On the other hand, in the case of FIG. 8, the intensity of the electromagnetic field in the core portion 111 is strong and constant compared to that in the case of FIG. 7. Further, the electromagnetic field emitted from the core portion 111 is significantly weakened as the electromagnetic field passes through the air layer 133, and thus the intensity of the electromagnetic field emitted to the outside of the shielding portion 113 is very weak. Accordingly, as illustrated in FIG. 2, it can be confirmed that the signal transmission efficiency of the communication line 100 increases as the distance between the conductor portion 120 and the core portion 111 increases.

Meanwhile, in the communication line according to the embodiment of the present invention, the core portion, the shielding portion, and the rib may be made of the same dielectric material. In this case, since the permittivity is the same in all portions of the communication line, according to the embodiment of the present invention, the frequency of the signal may be easily adjusted so that the signal transmitted through the core portion does not leak to the outside.

Further, in the communication line according to the embodiment of the present invention, the core portion, the shielding portion and the rib may be made of a flexible material. In this case, the communication line may be easily bent, and may be changed to have various shapes to connect chips and chips even in a narrow space. In addition, when a central hole is formed inside the core portion as described above, the communication line can be more easily bent.

Meanwhile, according to the present invention, a communication system may be constructed using the above-described communication line. This will be described with reference to FIG. 9.

Figure 9:
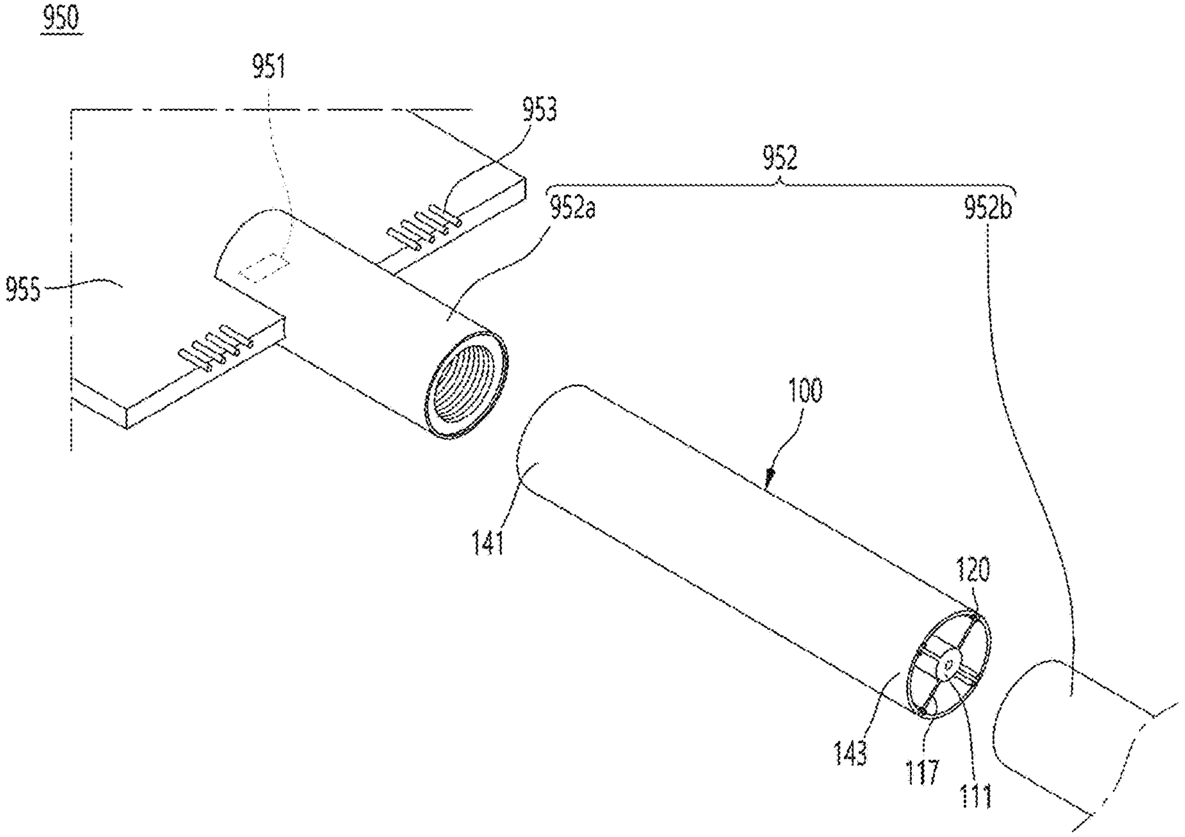
FIG. 9 is a view for describing a communication system according to an embodiment of the present invention.

FIG. 9 is a view for describing a communication system according to an embodiment of the present invention. In FIG. 9, an antenna 951 or a coupler 952 is illustrated as being spaced apart from a communication line 100, but this is for ease of description, and in some cases, the antenna 951 or the coupler 952 may be in contact with the communication line 100. Further, the communication line 100 disclosed in FIG. 9 may be the same embodiment as the communication line 100 disclosed in FIGS. 1 and 2.

Referring to FIG. 9, a communication system 950 includes the communication line 100 and a substrate 955 on which a terminal 953 connected to a conductor portion 120 is disposed. As the one end 141 of the communication line 100 is connected to the substrate 955 to transmit or receive signals, the other end 143 of the communication line 100 may also be connected another substrate (not illustrated). In this case, the communication line 100 may transmit a second signal in both directions through the conductor portion 120.

Meanwhile, the communication system may further include a connecting member for connecting the terminal 953 and the conductor portion 120. This will be described with reference to FIG. 10.

Figure 10:
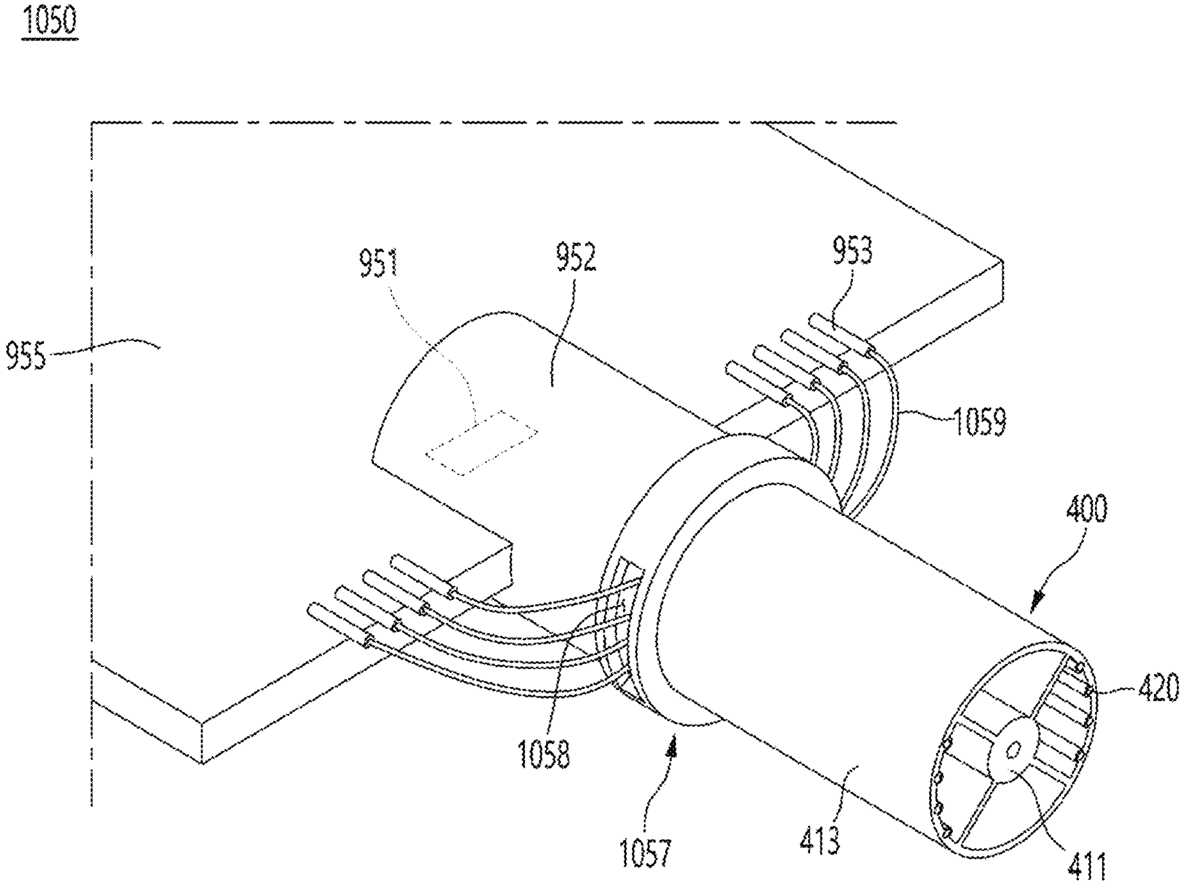
FIG. 10 is a view for describing a communication system according to another embodiment of the present invention.

FIG. 10 is a view for describing a communication system according to another embodiment of the present invention. A communication line 400 disclosed in FIG. 10 may be the same embodiment as the communication line 400 disclosed in FIG. 4.

Referring to FIG. 10, a communication system 1050 may further include a connecting member 1057 connected to the communication line 400 and having at least one opening 1058 formed therein. A shape of the connecting member 1057 and a method of connecting the connecting member 1057 and the communication line 400 may vary. For example, the connecting member 1057 may have a ring shape with an inner diameter that is greater than an outer diameter of the communication line 400, and the communication line 400 may be inserted into the connecting member 1057 and coupled to the connecting member 1057.

Referring to FIG. 10, the opening 1058, which is a path for connecting the conductor portion 120 disposed in the communication line 100 and the terminal 953 disposed on the substrate 955, may be formed in the connecting member 1057. In FIG. 10, the opening 1058 is illustrated as being formed in each of both sides of the connecting member 1057, but the location is determined according to the location of the conductor portion 420 disposed in the communication line 400, and the shape, the location, and the number of openings 1058 are not limited. That is, the shape, the location, and the number of openings 1058 may be determined according to the shape, the location, the number, or the purpose of conductor portions 420 and terminal 953.

Further referring to FIG. 10, the terminal 953 and the conductor portion 120 may be connected to each other with a conductor line 1059 through the opening 1058. That is, the conductor line 1059 may be connected to the conductor portion 420 through the opening 1058 to transmit or receive the second signal between the substrate 955 and the communication line 400. The conductor line 1059 and the terminal 953 may be connected to each other in various ways. For example, the conductor line 1059 and the terminal 953 may be connected to each other by soldering. Further, the conductor line 1059 may include a wire (not illustrated) and a cover (not illustrated) like the conductor portion 420. Further, the impedances of the terminal 953, the conductor line 1059, and the conductor portion 420 may be matched so that the second signal may be transmitted or received between the substrate 955 and the communication line 400 without loss.

Meanwhile, referring to FIGS. 9 and 10, the communication systems 950 and 1050 may further include an antenna 951 that is disposed on the substrate 955 and transmits or receives a first signal. Further, the communication systems 950 and 1050 may further include a coupler 952 that is connected to the connecting member 1057 and guides the first signal between the antenna 951 and the communication lines 100 and 400.

Referring to FIG. 9, as the antenna 951 is disposed in a first coupler **952*a*, another antenna (not illustrated) may be disposed in a second coupler 952*b*. In this case, the communication line 100 may transmit the first signal in two directions between the antennas 951** (not illustrated).

The antenna 951 according to the embodiment of the present invention may be surface mounted on a surface of the substrate 955, and in some cases, may be attached to the substrate 955 as a signal radiator manufactured separately from the substrate 955. For example, the antenna 951 according to the embodiment of the present invention may be a patch antenna or a horn antenna.

The coupler 952 according to the embodiment of the present invention may enable the first signal transmitted or received to or from the antenna 951 to be completely transmitted to the communication line 100. For example, the coupler 952 may prevent the first signal from leaking to the outside of the communication system 1050, and enable the first signal to have directivity between the antenna 951 and the communication line 100. Further, the coupler 952 may be a cylindrical waveguide as disclosed in FIGS. 9 and 10, but the shape of the coupler 952 is not limited thereto.

Further, the method of connecting the coupler 952 and the connecting member 1057 may vary. For example, as illustrated in FIG. 10, the coupler 952 may be coupled to be inserted into the connecting member 1057 having an inner diameter that is greater than an outer diameter of the coupler 952.

The material constituting the coupler 952 according to the embodiment of the present invention may vary. For example, the coupler 952 may be made only of the dielectric material, and may be composed by combining a dielectric structure and a conductor structure. In some cases, the coupler 952 may be a dielectric structure at least partially plated.

Meanwhile, in FIGS. 9 and 10, the antenna 951 is illustrated as having a quadrangular shape and being disposed on the substrate 955, but this is simply illustrated for ease of description, and the shape and arrangement location of the antenna 951 are not limited thereto. For example, the antenna 951 may have a circular shape and may be disposed inside the coupler 952 rather than the substrate 955.

Further, in FIGS. 9 and 10, the coupler 952 is illustrated as being disposed on the substrate 955 to cover the antenna 951, but the arrangement of the antenna 951 and the coupler 952 is not limited thereto. For example, the antenna 951 may be disposed outside the coupler 952. More specifically, for example, the antenna 951 may be disposed so as to radiate a signal from the outside of the coupler 952 toward one end of the coupler 952.

Meanwhile, although not illustrated in FIGS. 9 and 10, according to the embodiment of the present invention, the antenna 951 and the coupler 952 may be a structure (not illustrated) formed integrally. Such a structure (not illustrated) may transmit or receive the first signal and, and at the same time, guide the first signal between the substrate 955 and the communication lines 100 and 400.

Meanwhile, referring to FIG. 9, in the communication system 950, the communication line 100 may be installed such that a direction in which the rib 117 extends from the outer surface of the core portion 111 is misaligned with a horizontal polarization direction or vertical polarization direction of an electromagnetic wave signal transmitted or received to or from the antenna 951 so that the signal transmitted through the inside of the communication line 100 does not leak to the outside of the communication line 100. Here, the electromagnetic wave is composed of an electric field (E-field) and a magnetic field (H-field) that oscillate perpendicularly to each other, and the horizontal polarization direction of the electromagnetic wave signal may be either an electric field oscillation direction or a magnetic field oscillation direction, and the vertical polarization direction may be the other.

For example, as illustrated in FIG. 9, the communication line 100 may be disposed with a longitudinal direction rotated 45° around a central axis. In this case, the extension direction of the rib 117 may be a direction forming a character X, and the horizontal polarization direction or vertical polarization direction of the electromagnetic wave signal radiated from the antenna 951 may be a direction forming a cross (+). That is, the extension direction of the rib 117 may form a 45° angle with the horizontal polarization direction or vertical polarization direction of the electromagnetic wave signal. In this case, since the rib 117 and the polarization direction of the electromagnetic wave signal can be maximized, the phenomenon of the electromagnetic field leaking out of the communication line 100 can be minimized. Accordingly, a signal attenuation width according to a length of the communication line 100 can also be significantly reduced.

According to one of the solutions of the present invention, a communication line can simultaneously transmit various signals in addition to data signals, with high quality without mutual interference.

According to one of the solutions of the present invention, a communication line can transmit high-frequency electromagnetic wave signals with a low loss rate.

According to one of the solutions of the present invention, in a communication line or a communication system, an electric field leaking to the outside can be significantly reduced.

According to one of the solutions of the present invention, in a communication system, a communication line and a substrate can be easily connected.

The effects obtainable in the present invention are not limited to the above-described effects and other effects that are not described may be clearly understood by those skilled in the art from the above detailed descriptions.

While embodiments of the present invention have been described in more detail with reference to the accompanying drawings, the present invention is not necessarily limited to these embodiments, and various modifications may be made in the present invention without departing from the spirit and scope of the present invention. Accordingly, the embodiments disclosed in the present invention are not intended to limit the technical idea of the present invention but to explain it, and the scope of the technical idea of the present invention is not limited by these embodiments. Therefore, it should be understood that the embodiments described above are exemplary in all respects and not restrictive. The scope of the present invention should be interpreted by the appended claims and encompasses all modifications and equivalents that fall within the scope of the appended claims.

What is claimed is:

1. A communication line comprising:

a dielectric portion that extends in a longitudinal direction and transmits a first signal received at one end thereof to the other end thereof; and at least one conductor portion that extends in the longitudinal direction of the dielectric portion and transmits a second signal received at one end thereof to the other end thereof, wherein the dielectric portion includes:

a core portion extending in a longitudinal direction;

a shielding portion in a cylindrical shape that is disposed outside the core portion and extends in the longitudinal direction of the core portion; and at least one rib extending from an outer surface of the core portion to an inner surface of the shielding portion, and wherein the core portion, the shielding portion, and the at least one rib are made of the same dielectric material.

2. The communication line of claim 1, wherein the conductor portion is disposed in the shielding portion.

3. The communication line of claim 2, wherein the at least one rib is provided as a plurality of ribs.

4. The communication line of claim 3, wherein the plurality of ribs include a first rib, a second rib adjacent to the first rib, a third rib adjacent to the second rib, and a fourth rib adjacent to the third rib, and the first to fourth ribs are disposed to be spaced an equal interval from each other.

5. The communication line of claim 4, wherein the conductor portion is provided as a plurality of conductor portions, and the plurality of conductor portions are disposed between the first rib and the second rib and between the third rib and the fourth rib.

6. The communication line of claim 3, wherein the conductor portion is provided as a plurality of conductor portions, and the rib and the conductor portion disposed between the ribs are disposed to be maximally spaced apart from each other.

7. The communication line of claim 3, wherein the conductor portion is provided as a plurality of conductor portions, and a number of the conductor portions disposed between two adjacent ribs is constant.

8. The communication line of claim 2, wherein the conductor portion is provided as a plurality of conductor portions, and some of the plurality of conductor portions and the remaining conductor portions are disposed at opposite sides with the core portion interposed therebetween.

9. The communication line of claim 2, wherein the conductor portion is disposed at an end portion of the at least one rib.

10. The communication line of claim 1, wherein:

at least one insertion groove is formed in an outer surface of the shielding portion; and the at least one conductor portion is disposed in the insertion groove.

11. The communication line of claim 1, wherein the conductor portion is disposed in the middle of the at least one rib.

12. The communication line of claim 1, wherein, when the conductor portion is disposed, a protruding portion is formed on the inner surface of the shielding portion or on the at least one rib so that a dielectric material constituting the shielding portion or the at least one rib surrounds the conductor portion.

13. The communication line of claim 1, wherein the first signal and the second signal are different.

14. A communication system comprising:

the communication line of claim 1; and a substrate on which a terminal connected to the conductor portion is disposed.

15. The communication system of claim 14, further comprising a connecting member which is connected to the communication line and in which at least one opening is formed, wherein the terminal and the conductor portion are connected to a conductor line through the opening.

16. The communication system of claim 15, further comprising:

an antenna configured to transmit or receive the first signal; and a coupler that is connected to the connecting member and guides the first signal between the antenna and the communication line.

17. The communication system of claim 14, wherein the communication line is installed such that a direction in which a rib extends from a core portion is misaligned with a horizontal polarization direction or a vertical polarization direction of an electromagnetic wave signal so that a signal transmitted inside the communication line does not leak to an outside of the communication line.

* * * * *